United States Patent [19]

Licitis

[11] 3,904,210

[45] Sept. 9, 1975

[54] SOUND REPRODUCING DEVICE

[75] Inventor: Gunars Licitis, Lombard, Ill.

[73] Assignee: Marvin Glass & Associates, Chicago, Ill.

[22] Filed: Feb. 19, 1974

[21] Appl. No.: 443,335

[52] U.S. Cl. .................... 274/1 A; 274/9 R; 274/42

[51] Int. Cl.[2] .......................................... G11B 3/78

[58] Field of Search .................. 274/1 A, 42 R, 9 R

[56] References Cited

UNITED STATES PATENTS

| | | | |
|---|---|---|---|
| 2,680,150 | 6/1954 | Weld | 274/42 R |
| 3,738,195 | 6/1973 | Stern | 274/1 A |
| 3,801,110 | 4/1974 | Licitis | 274/42 R |

*Primary Examiner*—Richard E. Aegerter
*Assistant Examiner*—A. Jason Mirabito
*Attorney, Agent, or Firm*—Coffee & Sweeney

[57] ABSTRACT

A sound reproduction device for use in a talking doll or the like providing for the reproduction of a number of recorded message segments which are intended to be played in a plurality of different combinations. The device includes a plurality of rotatably mounted concentric record parts, each of which contains a plurality of recorded messages on spirally interleaved sound track grooves. During play the record parts are held together and a spring drive motor rotates the record parts as a stylus sequentially engages the grooves on the record parts to reproduce a combined message. A string is utilized to wind the motor. As the motor is wound, the tension in the spring operates through a release mechanism to release the record parts whereby they randomly rotate relative to one another to provide for changing the messages.

14 Claims, 9 Drawing Figures

SOUND REPRODUCING DEVICE

BACKGROUND AND SUMMARY OF THE INVENTION

This invention relates to phonographs and in particular to toy phonographs designed for use within talking dolls or other like structures. The present invention is specifically directed to a toy phonograph device which provides for playing of a randomly changeable sequence of message segments, for use within a toy, the message segments being recorded on concentric discs.

In the exemplary embodiment of the invention, the phonograph device includes a sound record comprised of a plurality of concentric annular disc portions, each of which contain a plurality of messages provided by spirally interleaved sound track grooves. The device includes means for releasably locking said record parts in any relative angular arrangement and also providing for random relative rotation of the record parts. Drive means are provided for rotating the sound record and the device includes sound reproducing means engageable with said record for audibly reproducing the messages thereon.

BRIEF DESCRIPTION OF THE PREFERRED EMBODIMENT

Figures 1, 2:
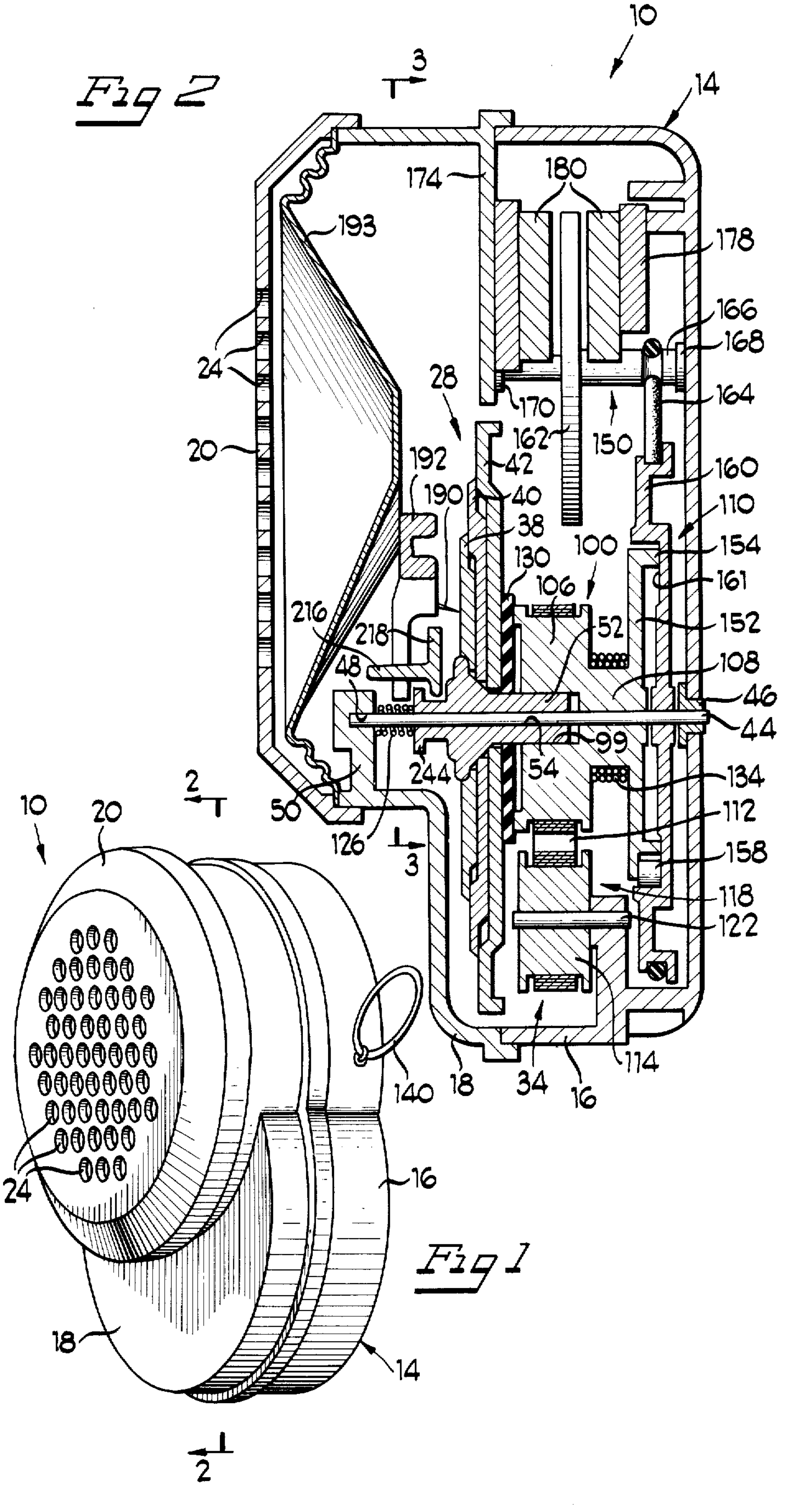
FIG. 1 is a perspective view of a phonograph device embodying the concepts of the present invention.
FIG. 2 is a vertical section, on an enlarged scale, taken generally along the line 2—2 of FIG. 1.

Looking to FIGS. 1 and 2, the sound reproduction device, generally designated 10, of the present invention is seen in a generally vertical orientation, which is the preferred operational orientation for the invention. Since the device 10 is designed to be disposed vertically during use as shown, it will be described in reference to the views as shown in FIGS. 1 and 2. Thus, in FIGS. 4 and 5, where the device is shown disposed horizontally, the elements will be described as per FIGS. 1 and 2.

The phonograph 10 includes a housing, generally designated 14, including a base portion 16, a cover portion 18 and a speaker enclosure 20. The speaker enclosure 20 includes a plurality of holes 24 to permit the escapement of the reproduced audible messages.

The device also includes a record, generally designated 28, upon which audible signals are mechanically or electronically recorded, and indexing means, generally designated 30 (FIG. 3), for permitting relative rotation of the record parts, as described in greater detail hereinafter. A tone arm return means, generally designated 32, is provided for returning the tone arm to its starting position after use. A spring drive means or motor, generally designated 34, is provided for rotating the record 28 during use.

The record 28 contains three concentric record parts 38, 40 and 42. The record 28 is mounted for rotation about a horizontally disposed shaft 44 (FIG. 2). The shaft 44 is mounted in a bearing 46 in the base portion 16 of the housing and a second bearing 48 in a vertical tab 50 formed as part of the cover portion 18 in the housing. An indexing shaft 52 (FIG. 7) includes a lengthwise hole 54 for rotatably receiving the shaft 44. The indexing shaft is engageable with the record 28 for rotation and indexing of the record parts 38, 40 and 42 as described in greater detail hereinafter.

Figures 6, 7, 8, 9:
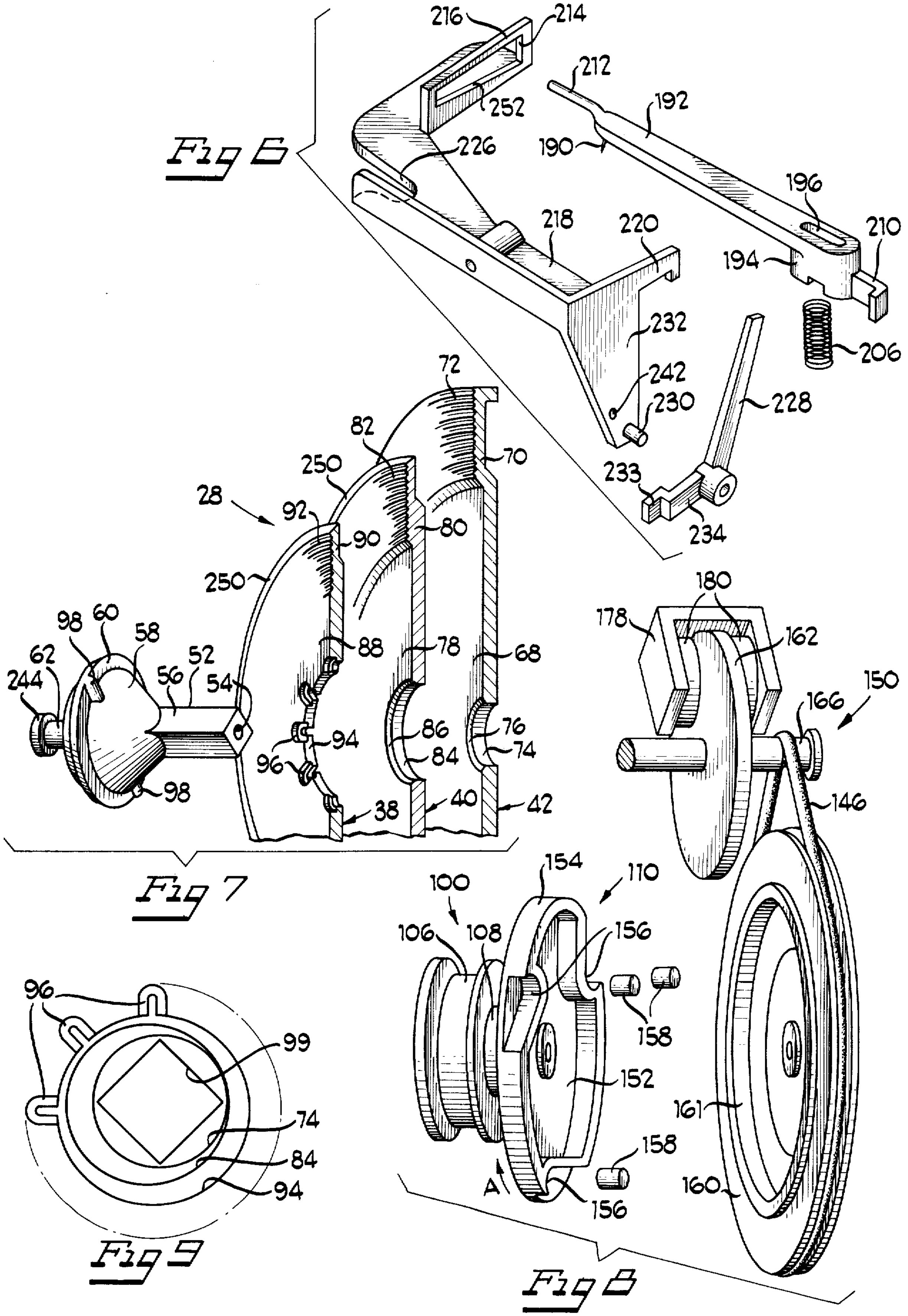
FIG. 6 is an exploded view of the tone arm return means, shown on an enlarged scale.
FIG. 7 is an exploded view of the record parts and indexing shaft.
FIG. 8 is an exploded view of the turn table one-way clutch and magnetic governor.
FIG. 9 is a somewhat schematic view of the record parts showing relative positioning in their indexing position.

The indexing shaft, as best seen in FIG. 7, includes a square section 56, a cone section 58, a record journal section 60 and a top circular shaft portion 62. The hole 54 through the entire length of the indexing shaft 52 provides a bearing surface for the indexing shaft about the central shaft 44.

The record portions 38, 40 and 42 are shown in an exploded view in FIG. 7. The largest record portion 42 includes a center portion 68 and a stepped portion 70 which may be molded integrally with the disc portion 68 and which contains recorded signals or messages in grooves 72. The large disc 42 includes a circular hole 74 in the center thereof and a chamfered edge 76 about the hole for engagement with the cone section 58 of the indexing shaft.

The middle record portion 40 includes a center portion 78 which is smaller than the center portion 68 of disc 42 and a stepped portion 80 which includes recorded signals or messages in grooves 82. The disc 40 has a hole 84 in the center thereof, and a chamfered edge 86 for engagement with the cone section 58 of the indexing shaft 52. The central hole 84 in the intermediate record disc 40 is larger than the central hole 74 in the record disc 42 such that the chamfered edges 86 and 76, respectively, will simultaneously contact the cone portion 58 of the indexing shaft 52. The smallest record disc 38 includes a center portion 88 and a stepped recording portion 90 upon which grooves 92, containing the signals or messages, are provided. A yet larger hole 94 is formed in the center of record 38 and includes a plurality of notches 96 around the circumference thereof. The notches 96 engage a pair of tabs 98 on the indexing shaft for positive rotation of the combined record 28.

Figure 4:
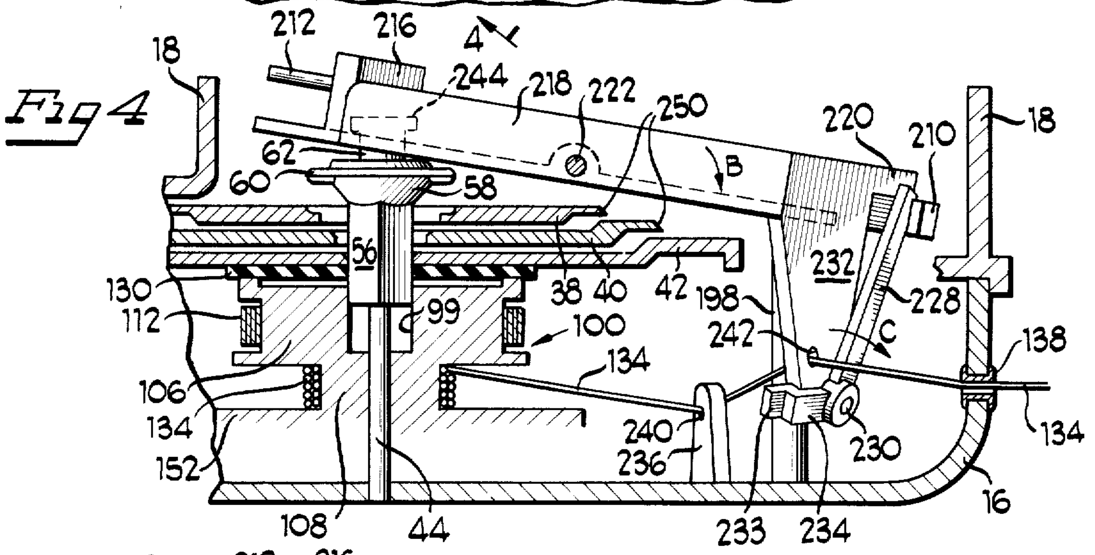
FIG. 4 is a fragmentary vertical section, on an enlarged scale, taken generally along the line 4—4 of FIG. 3, with various components of the device in their relative indexing positions.
Figure 5:
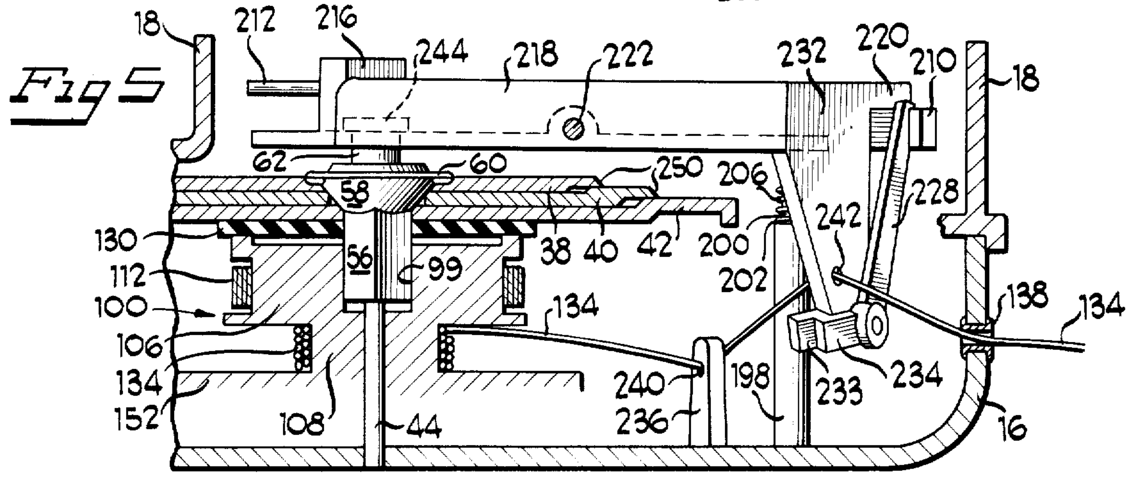
FIG. 5 is a fragmentary vertical section similar to FIG. 4, with the various components of the device in their relative playing positions.

The square portion 56 of the indexing shaft performs two functions. First, the square portion 56 causes the record portions 38 and 40 and 42 to randomly rotate relative to one another when the device is in the indexing position. This operation will be described in greater detail after the description of the second function which is to engage the drive means 34 to rotate the combined record during playing of the messages. More particularly, the square portion 56 of the indexing shaft 52 engages a similarly shaped hole 99 in a turntable, generally designated 100 (as seen in FIGS. 4, 5 and 9).

The turntable 100 includes a pulley portion 106 which is interconnected by a string shaft or pulley portion 108 to a one-way clutch mechanism, generally designated 110. A negator spring 112 (FIGS. 2–4) is wrapped at one end around the pulley portion 106 and at the opposite end around a second pulley 114 (FIG. 2) forming a spring motor assembly, generally designated 118. The spring motor assembly 118 includes the negator spring 112, the pulley 114 and a centrally disposed shaft 122 upon which the pulley 118 is rotatably mounted. The shaft 122 is secured to the base portion 16 of the housing. The negator spring 112 is a band of spring steel which is initially wrapped around the pulley 114. As the spring motor assembly is wound, the spring 112 is coiled onto pulley 106 from pulley 114. Then, under the tension of the spring 112, pulley 114 will rotate and cause pulley 106 to rotate. This rotation is transmitted through the square portion 56 of the indexing shaft to the record portions 38, 40 and 42 when in the playing relationship of FIG. 5. A spring (FIG. 2) is coiled around the shaft 44 and biases the indexing shaft 52 into engagement with the three record portions 38, 40 and 42. A rubber gasket 130 is disposed between the large record 42 and the turntable 100 and provides a seat for the records as well as assisting in rotating the combined record through the larger record part.

A pull string 134 (FIGS. 4 and 5) is provided to wind the spring motor assembly 118. The string 134 enters through an eyelet 138 in the base portion 16 of the housing and is wrapped around the string pulley shaft 108. A ring 140 is secured to the outer end of the string 134. Thus, to wind the spring motor, the ring 140 is manually grasped and pulled outwardly relative to the device 10, which rotates the turntable 100 and stores energy in the spring motor assembly 118. When the tension on the string 134 is released, the spring motor assembly 118 causes the records 38, 40 and 42 to rotate as described above.

The one-way clutch 110 (FIGS. 2 and 8) is operatively associated with a governor, generally designated 150, to regulate the speed of the spring motor. More particularly, the one-way clutch 110 includes a disc 152 secured to the end of the string shaft pulley 108 as seen in FIGS. 2 and 8. A flange 154 is provided on the disc 152 and includes three angularly spaced detents, generally designated 156. A cylindrical plug 158 is placed within each detent 156. The clutch 110 includes a large diameter pulley 160 which has a cylindrical cutout 161 about its central axis approximately the same depth as the flange 154. Thus, as can be seen in FIG. 8, as the clutch 110 is rotated in the direction of arrow A, the plugs 158 will move outwardly in the detents 156 along the angled walls thereof and engage the pulley 160.

The pulley 160 through a belt 164 drives a metallic disc 162. The belt 164 is wrapped about a shaft 166 secured to the disc 162. The shaft 166 is rotatably mounted in a bearing 168 in the base portion of the housing and a second bearing 170 formed in a support plate 174 of the cover portion 18 of the housing. A generally U-shaped support element 178 is secured to the base portion 16 and mounts two permanent magnets on either side of the metallic disc 162. The magnets 180 create electromagnetic forces which regulate the speed of the disc 162 and thus the pulley 160, disc 152, and turntable 100. The spring motor assembly 118 drives the pulley 106 in the direction of arrow A (FIG. 8) as the message is being reproduced from the record, and thus the governor 150 controls and regulates the rotational speed of the records. The clutch 110 is provided since it is desirable to disengage the pulley and governor 150 during winding of the spring motor assembly 118. Thus, as the string 134 is pulled, the shaft 108 and the clutch 110 rotate in a direction opposite that of arrow A in FIG. 8 and disengage the clutch by causing the plugs 158 to fall into the detents 156 out of engagement with the pulley 160 so that the pulley does not retard the winding process.

Figure 3:
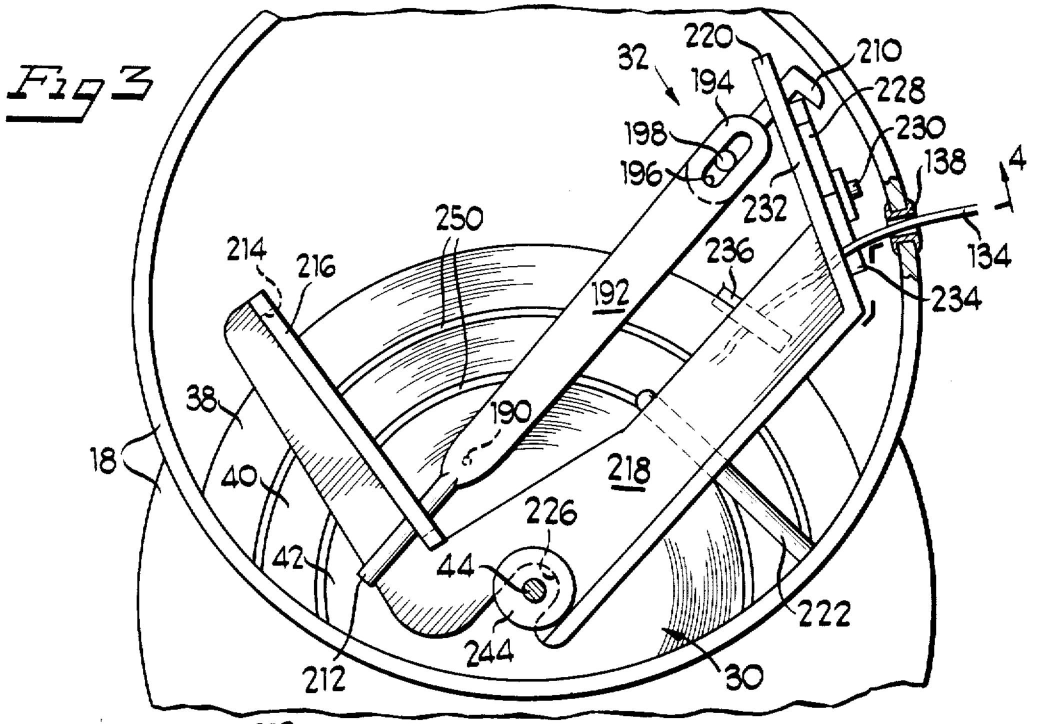
FIG. 3 is a horizontal section taken generally along the line 3—3 of FIG. 2.

A stylus 190 (FIGS. 2, 3 and 6) is secured to a tone arm 192 and is used to follow the grooves 72, 82 and 92 in the respective record portions 42, 40 and 38 to reproduce the audible signal or message. The tone arm 192 is in constant engagement with a flexible diaphragm or speaker 193 and transmits the vibrations from the stylus 190 to the diaphragm 193 to produce the audible signal. More particularly, the tone arm 192 includes an elliptical section 194 on the right end as shown in FIG. 6. A slot 196 is formed above the elliptical section and engages the top of a tone arm support shaft 198, as seen in FIGS. 3, 4 and 5. The tone arm support shaft includes a narrow upper section 200 and a shoulder 202 which forms the larger diameter of the shaft 198. The tone arm biasing spring 206 is wrapped around the smaller diameter 200 and biases the tone arm upwardly. The tone arm 192 also includes an L-shaped extension 210 on its right end and an offset protrusion 212 on its left end.

The offset protrusion 212 engages in a slot 214 formed on an upstanding flange 216 of an indexing arm 218 (FIG. 6). The tab 210 engages an L-shaped section 220 on the indexing arm, under the force of the spring 206. The indexing arm 218 is pivotally mounted on a shaft 222 (FIGS. 3–5) extending generally parallel to the cover portion 18 of the housing 14. The indexing arm includes a yoke portion 226 which engages the circular portion 62 of the indexing shaft 52. A tone arm return lever 228 is pivotally mounted on a pin 230 secured to an extension 232 of the indexing arm 218. Stop means in the form of an offset portion 233 of an extension 234 of the return lever 228 engages the portion 232 of the indexing arm 218 to limit the travel of the lever 228.

A tab 236 (FIGS. 3–5) is provided on the base portion 16 to guide the string 134 during actuation of the indexing means 30.

The indexing means 30 also is operated by the string 134 which winds the spring motor 118 as previously described. More particularly, the string 134 passes through a hole 240 in the tab 236 and a second hole 242 in the lower portion 232 of the indexing arm 218. Thus, as the spring motor 118 is rewound, the tension in the string 134 causes the indexing arm 218 to pivot downwardly in the direction of arrow B (FIG. 4) from the position as shown in FIG. 5 to the position as shown in FIG. 4. This rotation, causes the yoke 226 of the indexing arm to engage a cap 244 on the end of the indexing shaft 52 and move it against the force of the spring 126 as shown in FIG. 2. As the cone section 58 disengages the record portions 38, 40 and 42, the record portions move out of concentric alignment and the holes 74, 84 and 94 in the center portion of the records engage the smaller dimensional square portion 56 of the indexing shaft as shown in FIG. 9 because of the gravitational forces on the record when in the aforesaid vertical position. As the string 134 is pulled, the square indexing shaft 52 rotates and causes the record portions 38, 40 and 42 also to rotate somewhat "sloppily" or randomly due to engagement with the edges of the square shaft. In addition, because of the different diameters of the holes 74, 84 and 94 in the record parts, each record part will move through a different arc of rotation. Then, as the tension on the string 134 is released, the indexing arm will rotate in a direction opposite that of arrow B from the position as shown in FIG. 4 to the position as shown in FIG. 5. This movement allows the indexing shaft 52 to move to the left as shown in FIG. 2 under the force of the spring 126. The cone-shaped portion 58 causes the record portions 38, 40 and 42 to realign concentrically. It can be seen that the indexing means 30 thus cause the record parts 38, 40 and 42 to randomly rotate relative to one another to create a different series, or combination of messages.

Looking to FIG. 3, the stylus 190 starts in the centralmost groove of the record part 38 and moves outwardly along the record grooves. The edges of the records 38 and 40 each includes a chamfered portion 250 which facilitates the movement of the stylus from one record part to another. Also, the flange 216 on the indexing arm 218 includes a slanted edge 252 (FIG. 6) which provides clearance and permits the stylus to move toward the next adjacent level of the combined record 28. As the stylus reaches the end of the record portion 42, the spring motor will be completely unwound and the records will stop rotating. As the string 134 is pulled to rewind the spring motor 118 and string engages the tone arm return lever 228 and rotates it in the direction of arrow C (FIG. 4). This causes the tone arm return lever 228 to engage the L-shaped portion 210 of the return arm 192 and rotate it about the shaft 198 thereby causing the stylus to be returned to the beginning of the first record. As the stylus is returning, the indexing arm 218 is in the indexing position as shown in FIG. 4 and the stylus 190 is raised from the surface of the record 28 and does not engage the records until the string tension is released allowing the indexing arm to rotate in a direction opposite that of arrow B to realign the record parts.

The foregoing detailed description has been given for clearness of understanding only and no unnecessary limitations should be understood therefrom as some modifications will be obvious to those skilled in the art.

I claim:

1. In a toy or the like, a multiple message reproducing apparatus, comprising:

a housing;

sound reproducing means on said housing for reproducing audible messages including a tracking portion and drive means for moving a sound record relative to said tracking portion, said drive means including a spring motor and pull string for winding the spring motor;

a sound record having a plurality of relatively movable adjacent record parts with a plurality of sound track portions on each record part adapted to be engaged seriatim from one record part to another by said tracking portion, each sound track portion containing a different message so that a substantially continuous sound track is formed extending over all of the record parts as the tracking portion moves thereacross; and random indexing means for releasably locking said record parts in any relative angular arrangement and for causing free and random relative movement of the record parts when they are released, said pull string being operatively assoicated with said indexing means for actuating the indexing means in response to tension on the string whereby the content of the continuous sound track changes randomly.

2. The apparatus of claim 1 wherein said relatively movable record parts comprise a plurality of generally annular concentric record discs that are mounted for movement toward and away from each other upon actuation of said random indexing means along an axis generally perpendicular thereto.

3. The apparatus of claim 2 including transmission means between said record parts in the form of a blank circular band to separate the sound track portions on one record part from the sound track portions on an adjacent record part so that the tracking portions are allowed to pass randomly from one record part to the other.

4. The apparatus of claim 3 including a circular peripheral chamfered portion about each record part sequentially overlapping the next adjacent record part to facilitate the tracking portion passing from one record part to the next adjoining record part.

5. The apparatus of claim 1 wherein the indexing means includes an indexing shaft for receiving the record discs through apertures in the centers thereof, said indexing shaft having an aligning portion that is engageable with all of the discs simultaneously for concentrically aligning said discs for reproducing purposes, said indexing shaft being movable between a locking position wherein the discs are concentrically held together as a unitary sound record by said aligning portion and an indexing position wherein said discs are free to angularly and longitudinally move relative to one another along said shaft in response to tension on the pull string.

6. The apparatus of claim 5 wherein said record apertures are of substantially different diameters so that engagement of each record aperture with the indexing shaft causes substantially different arcuate rotation of each record part.

7. The apparatus of claim 6 wherein said indexing shaft has a generally square cross section for engagement with the record apertures to increase the friction between said apertures and said indexing shaft.

8. The apparatus of claim 7 wherein said sound reproducing means includes a movable tone arm for carrying said tracking portion, said tone arm being movable between a beginning position wherein said tracking portion is disposed for commencing the play of the record and an ending position, said pull string being operative to move said tone arm from its ending position to its beginning position.

9. In a toy or the like, a multiple message reproducing apparatus, comprising:

a housing;

sound reproducing means on said housing for reproducing audible messages from a sound track, said sound reproducing means having a tracking portion, a movable tone arm for carrying said tracking portion, said arm being movable between a beginning position wherein said tracking portion is disposed for commencing the play of the record and an ending position, and drive means for moving a sound record relative to said tracking portion and for moving said tone arm from its ending position to its beginning position;

a sound record comprising a plurality of generally annular concentric record discs that are mounted for movement toward and away from each other along an axis generally perpendicular thereto, with a plurality of spaced apart sound track portions formed on each record part adapted to be engaged seriatim from one record part to another by said tracking portion, each sound track portion containing a different message and transition means between each adjacent record comprising a blank circular band to separate the sound track portions on one record part from the sound track portions on an adjacent record part so that the tracking portion is allowed to pass randomly from one record part to the other so that a substantially continuous sound track is formed extending over all of the record parts; and random indexing means for releasably locking said record parts in any relative angular arrangement and providing for relative movement of the record parts, said indexing means comprising an indexing shaft for receiving the record parts through the centers thereof, said indexing shaft having an aligning portion that is engageable with all of the record parts simultaneously for concentrically aligning said record parts, said indexing shaft being movable between a holding position wherein the record parts are concentrically held together as a unitary sound record on said aligning portion and an indexing position wherein said record parts are free to angularly and longitudinally move relative to one another along said shaft.

10. The apparatus of claim 9 wherein said indexing shaft has a generally square cross section and is generally horizontally disposed when the toy is in its intended upright disposition.

11. The apparatus of claim 10 wherein the drive means includes a spring motor operatively connected to the record and a pull string actuator to wind said motor whereby activation of said pull string stores energy in the motor, said pull string being operatively associated with said random indexing means so as to move the indexing shaft to unlock the record parts and rotate the indexing shaft to rotate the record parts relative to one another as the record parts rest by gravity on the indexing shaft.

12. The apparatus of claim 11 wherein said pull string is operatively associated with said tone arm to move the tone arm to its beginning position when the string is pulled to wind the motor and actuate the indexing means.

13. The apparatus of claim 9 including biasing means to constantly urge the indexing shaft into simultaneous engagement with the record parts.

14. The apparatus of claim 9 wherein said blank circular band is disposed on a circular peripheral chamfered portion about each record part sequentially overlapping the next adjacent record part to facilitate the tracking portion passing from one record part to the next adjoining record part.

* * * * *